(12) United States Patent
McMakin et al.

(10) Patent No.: US 7,986,260 B2
(45) Date of Patent: Jul. 26, 2011

(54) CIRCULARLY POLARIZED ANTENNAS FOR ACTIVE HOLOGRAPHIC IMAGING THROUGH BARRIERS

(75) Inventors: Douglas L McMakin, Richland, WA (US); Ronald H Severtsen, Richland, WA (US); Wayne M Lechelt, West Richland, WA (US); James M Prince, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 185 days.

(21) Appl. No.: 12/388,335

(22) Filed: Feb. 18, 2009

(65) Prior Publication Data

US 2010/0207803 A1 Aug. 19, 2010

(51) Int. Cl.
*G01S 7/02* (2006.01)
*G01S 13/89* (2006.01)
*H01Q 1/36* (2006.01)
*G01S 13/00* (2006.01)

(52) U.S. Cl. .......... 342/22; 342/175; 342/176; 342/179; 342/188; 342/361; 342/365; 343/700 R; 343/895; 343/700 MS

(58) Field of Classification Search ............. 342/21, 342/22, 27, 28, 73–81, 82–103, 147, 156–158, 342/175, 176, 179, 188, 59, 192–197, 361–366, 342/368–377; 343/703, 756, 895, 907–916, 343/700 MS, 700 R
See application file for complete search history.

(56) References Cited

U.S. PATENT DOCUMENTS

| | | | | |
|---|---|---|---|---|
| 3,686,674 A * | 8/1972 | Clasby et al. | ......... | 343/895 |
| 3,969,732 A * | 7/1976 | Holloway | ......... | 343/895 |
| 4,032,921 A * | 6/1977 | Sikina et al. | ......... | 343/895 |
| 4,143,380 A * | 3/1979 | Kyle | ......... | 343/895 |
| 4,319,248 A * | 3/1982 | Flam | ......... | 343/895 |
| 4,525,720 A * | 6/1985 | Corzine et al. | ......... | 343/895 |
| 5,051,748 A | 9/1991 | Pichot et al. | | |
| 5,508,710 A * | 4/1996 | Wang et al. | ......... | 343/895 |
| 5,619,218 A * | 4/1997 | Salvail et al. | ......... | 343/895 |
| 5,621,422 A * | 4/1997 | Wang | ......... | 343/895 |
| 5,815,122 A * | 9/1998 | Nurnberger et al. | ......... | 343/895 |
| 5,936,594 A * | 8/1999 | Yu et al. | ......... | 343/895 |
| 5,990,849 A * | 11/1999 | Salvail et al. | ......... | 343/895 |
| 6,023,250 A * | 2/2000 | Cronyn | ......... | 343/895 |
| 6,266,027 B1 * | 7/2001 | Neel | ......... | 343/895 |

(Continued)

FOREIGN PATENT DOCUMENTS

WO 2007123514 A1 1/2007

OTHER PUBLICATIONS

Engargiola, G., "Tapered microstrip balun for integrating a low noise amplifier with a nonplanar log periodic antenna", Review of Scientific Instruments, Dec. 2003, 5197-5200 pps, vol. 74, No. 12, American Institute of Physics, Berkeley, California, US.

(Continued)

*Primary Examiner* — Bernarr Gregory
(74) *Attorney, Agent, or Firm* — Allan C. Tuan

(57) ABSTRACT

Circularly-polarized antennas and their methods of use for active holographic imaging through barriers. The antennas are dielectrically loaded to optimally match the dielectric constant of the barrier through which images are to be produced. The dielectric loading helps to remove barrier-front surface reflections and to couple electromagnetic energy into the barrier.

8 Claims, 5 Drawing Sheets

U.S. PATENT DOCUMENTS

| | | | |
|---|---|---|---|
| 6,300,919 B1 * | 10/2001 | Mehen et al. | 343/895 |
| 6,317,101 B1 * | 11/2001 | Dockery | 343/895 |
| 6,791,497 B2 * | 9/2004 | Winebrand et al. | 343/895 |
| 6,864,856 B2 * | 3/2005 | Lynch et al. | 343/895 |
| 6,975,281 B2 * | 12/2005 | Neel | 343/895 |
| 2002/0105455 A1 | 8/2002 | Wright | |
| 2005/0243013 A1 | 11/2005 | Neel | |
| 2007/0075889 A1 | 4/2007 | Sheen et al. | |

OTHER PUBLICATIONS

International Search Report/Written Opinion, Dated Sep. 27, 2010.

Van Genderen, P., et al., "Some experience with the use of spiral antennas for a GPR for landmine detection," Radar Conference, 2003, Proceedings of the International Adelaide, SA, Australia 3-5, Sep. 3, 2003, Piscataway, NJ, USA, pp. 219-223, IEEE, U.S.

\* cited by examiner

CIRCULARLY POLARIZED ANTENNAS FOR ACTIVE HOLOGRAPHIC IMAGING THROUGH BARRIERS

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

Active holographic imaging using RF, microwaves, and/or millimeter waves can produce images of objects that are embedded, concealed, and/or obscured by a barrier. However, this task is made difficult when the barrier comprises a dielectric material and the antennas that transmit and receive the electromagnetic radiation used for imaging are not optimized for that particular barrier material. Problems associated with non-optimized antennas can include surface reflections off of the barrier, poor penetration of electromagnetic energy into the barrier, and issues associated with polarized-dependent objects embedded in the barrier or existing behind the barrier. Examples of barriers can include, but are not limited to, concrete, masonry, wall board, wood, and ceramic. Accordingly, a RF, microwave, and/or millimeter wave antennas for active holographic imaging through barrier materials that is matched to the barrier material is needed.

SUMMARY

The present invention includes circularly-polarized antennas and methods for their use in active holographic imaging through barriers. As used herein, active holographic imaging refers to RF, microwave, and/or millimeter-wave imaging systems that operate by illuminating the target with a diverging RF, microwave, and/or millimeter-wave beam and recording the amplitude and phase of the scattered signal over a wide frequency bandwidth. Amplitude and phase reflection data from the transceiver are gathered over a wide frequency bandwidth and sampled over the planar aperture. These data are then focused or reconstructed using a wideband, three-dimensional, image reconstruction algorithm. Highly efficient Fast Fourier Transform (FFT) based image reconstruction algorithms can then mathematically focus, or reconstruct, a three-dimensional image of the target as described in Sheen, D. M., D. L. McMakin, and T. E. Hall, *Three-dimensional millimeter-wave imaging for concealed weapon detection.* IEEE Transactions on Microwave Theory and Techniques, 2001. 49(9): p. 1581-92. Preferred algorithms make extensive use of one, two, and three-dimensional FFT's and are highly efficient. The resolution of the resulting images is diffraction-limited, i.e. it is limited only by the wavelength of the system, aperture size, and range to the target and is not reduced by the reconstruction process.

RF, microwave, and/or millimeter-waves can readily penetrate barriers such as concrete, wallboard, wood, masonry, etc., thus allowing an active imaging system to reveal concealed and/or obstructed items. Passive millimeter-wave imaging systems operate using the natural millimeter-wave emission from an object and any concealed items. These systems use lenses or reflectors to focus the image, and rely on temperature and/or emissivity contrast to form images of the object along with any concealed items. In some instances, passive systems can include an external source or millimeter waves, but imaging still relies on lenses and/or reflectors to focus the image.

Active RF, microwave, and/or millimeter-wave imaging systems have several advantages over passive systems including elimination of bulky lenses/reflectors, high signal-to-noise ratio operation, and high contrast for detection of concealed items. In addition to RF, microwave, and/or millimeter-wave imaging systems, backscatter x-ray systems have also been developed for through barrier imaging. These systems can be very effective, however, they are bulky and may require access to both sides of the barrier. Additionally, high levels of ionizing radiation used with certain X-ray systems may limit the operators' proximity to this interrogation system, which limits operational efficiencies for scanning large surface areas.

The antennas of the present invention are dielectrically loaded to optimally match the dielectric barrier material from which images are to be produced. The circularly-polarized antennas allow optimal active imaging performance as they help to remove barrier front surface reflections, optimally couple the electromagnetic energy into the barrier, and remove issues associated with polarized-dependent objects embedded in the barrier or existing behind the barrier.

In one embodiment of the present invention, the circularly polarized antennas are dielectrically loaded to substantially match the dielectric constant of the barrier. A dielectric loading comprises a dielectric material on which is fabricated antenna arms arranged as concentric Archimedean spirals originating at an antenna launch point. The dielectric material has a dielectric constant that substantially matches that of the barrier. The antenna further comprises a balun that matches an unbalanced feed impedance to the antenna launch point impedance. The antenna is configured accordingly remove barrier-front surface reflections, couple electromagnetic energy into the barrier, and are configured to transmit and receive electromagnetic radiation at one or more frequencies that are between 50 MHz and 1 THz. In a preferred embodiment the antenna can be configured to transmit and receive electromagnetic radiation at one or more frequencies that are between approximately 0.5 GHz and 110 GHz.

In most, but not all, implementations a plurality of such antennas are arranged in an array and are operably connected to a holographic active imaging device. An exemplary holographic active imaging device is a portable, hand-scannable device having an array of antennas, wherein each antenna is configured according to embodiments of the present invention.

Exemplary barrier materials can comprise concrete, masonry, wall board, wood, ceramic, or combinations thereof.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood that there is no intention to limit the invention to the specific form disclosed, but, on the contrary, the invention is to cover all modifications, alternative constructions, and equivalents falling within the spirit and scope of the invention as defined in the claims.

Figure 1:
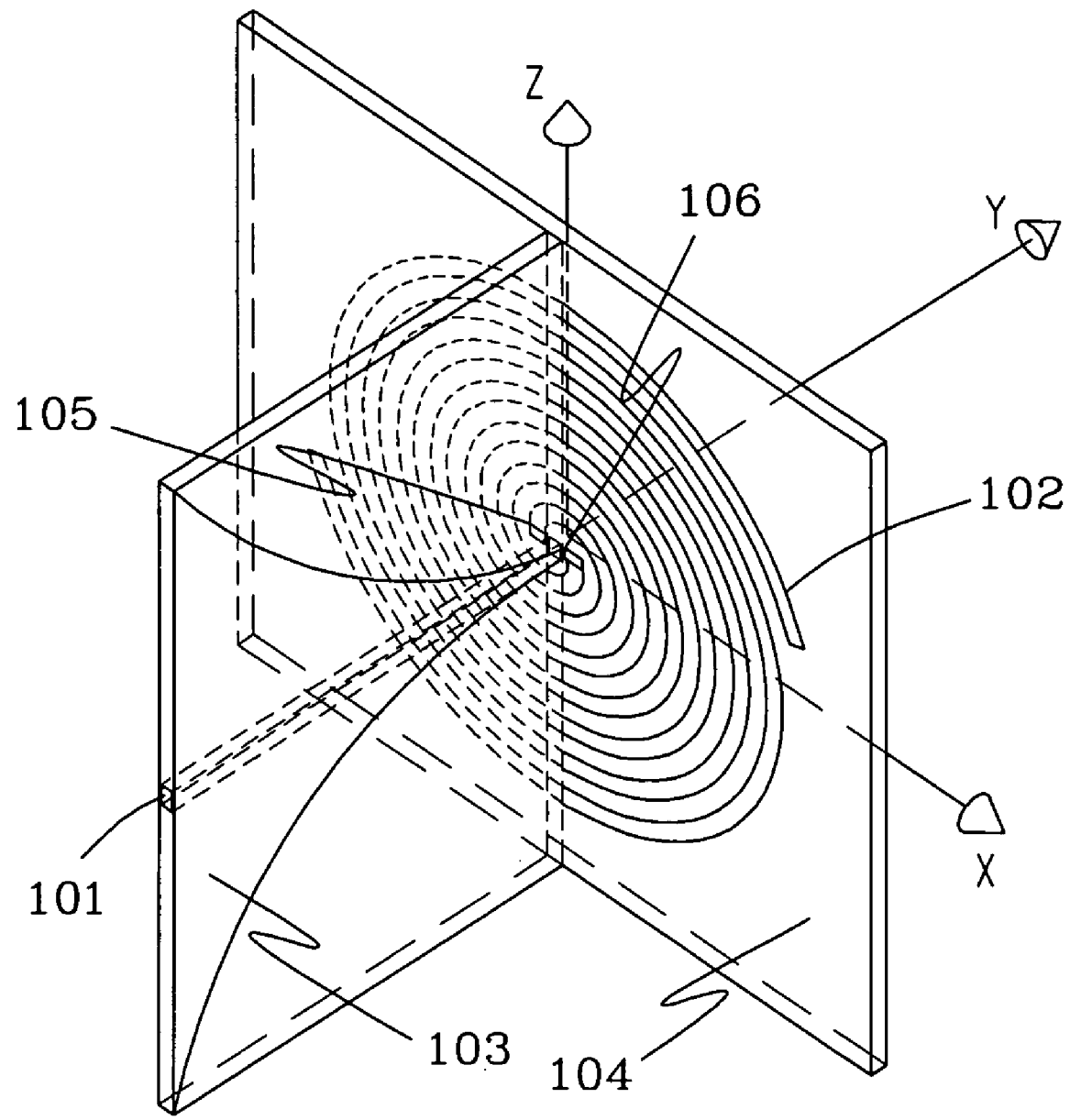
FIG. 1 is a diagram of an antenna configured according to embodiments of the present invention.

FIGS. 1-5 show a variety of embodiments of the present invention. Referring first to FIG. 1, a first view of one embodiment of the present invention is shown. Two antenna arms 102 are arranged as concentric Archimedean spirals that originate in the center region of the spirals, which is referred to herein as the antenna launch point 106. The spiraling antenna arms are arranged on the surface of a dielectric material 104 and are fed through a balun 103. The balun receives an unbalanced feed 101 on one side, for example from a coaxial cable, and transforms it to a balanced feed 105 at the launch point 106. According to embodiments of the present invention, the balun also matches the impedance at the unbalanced side to that at the antenna launch point. In preferred embodiments, the balun comprises microstrip feed lines that electrically connect the feed to the antenna. Alternatively, the balun can comprise a coil transformer.

Figure 2:
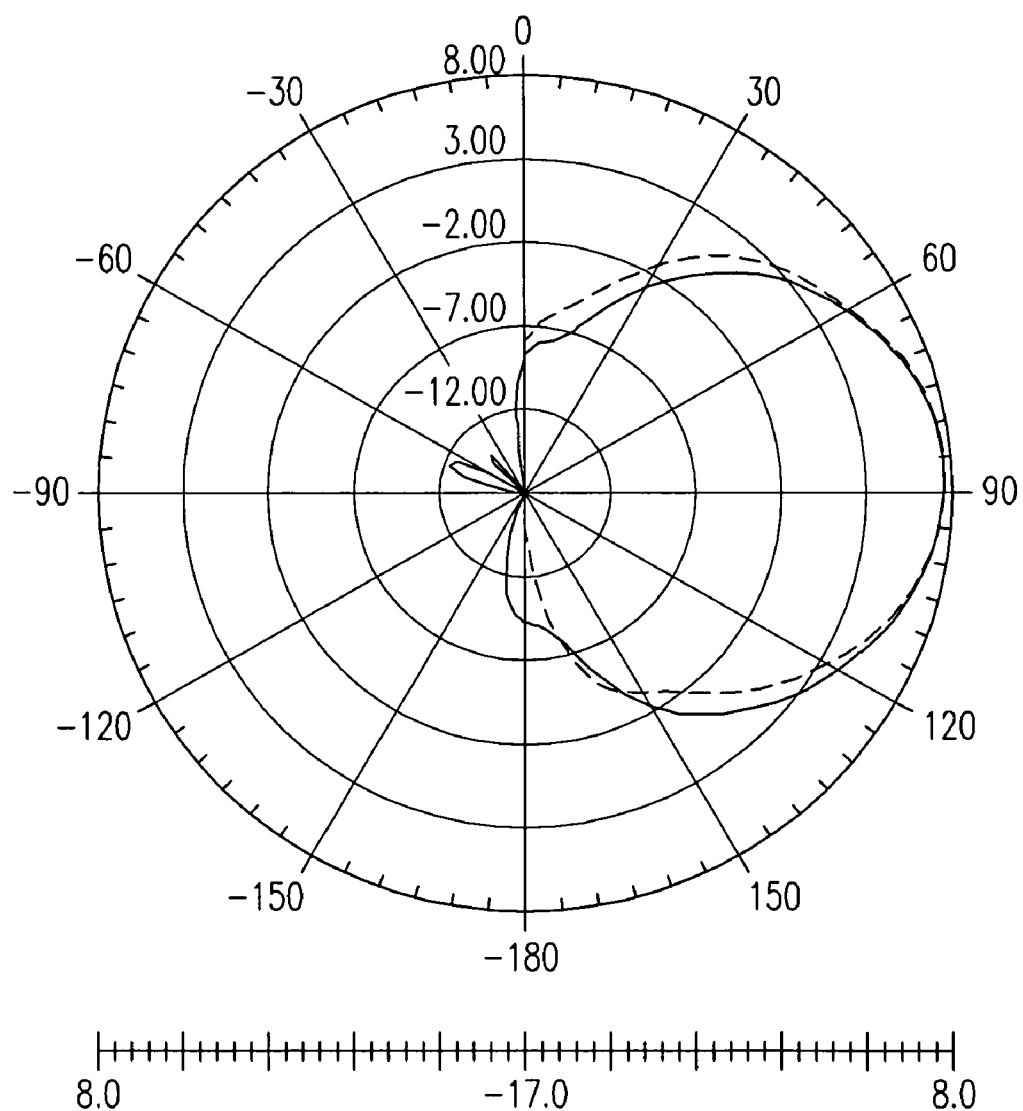
FIG. 2 is a plot of a predicted gain pattern generated by an embodiments of the present invention.
Figure 3A:
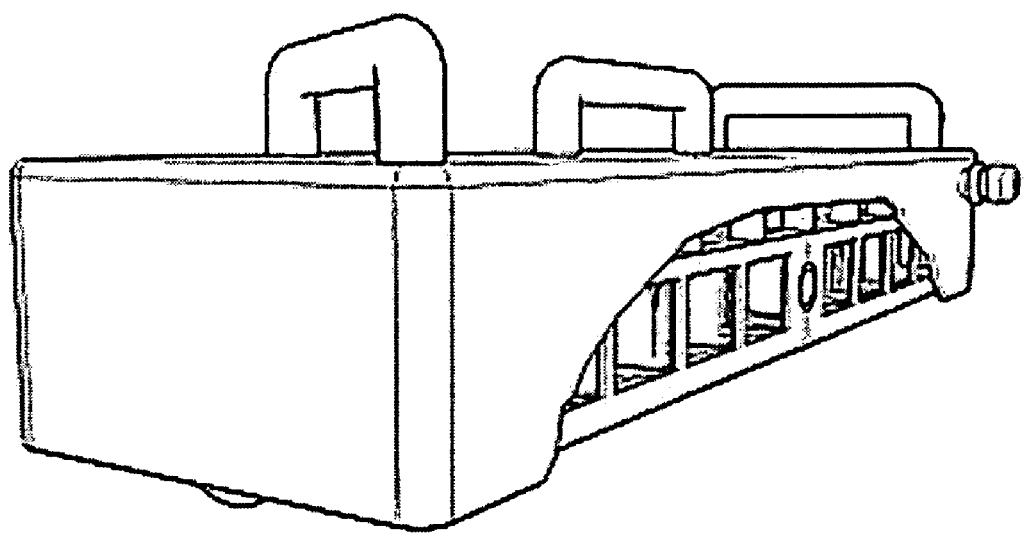
FIGS. 3a and 3b are diagrams of a handheld scanner utilizing embodiments of the present invention.
Figure 3B:
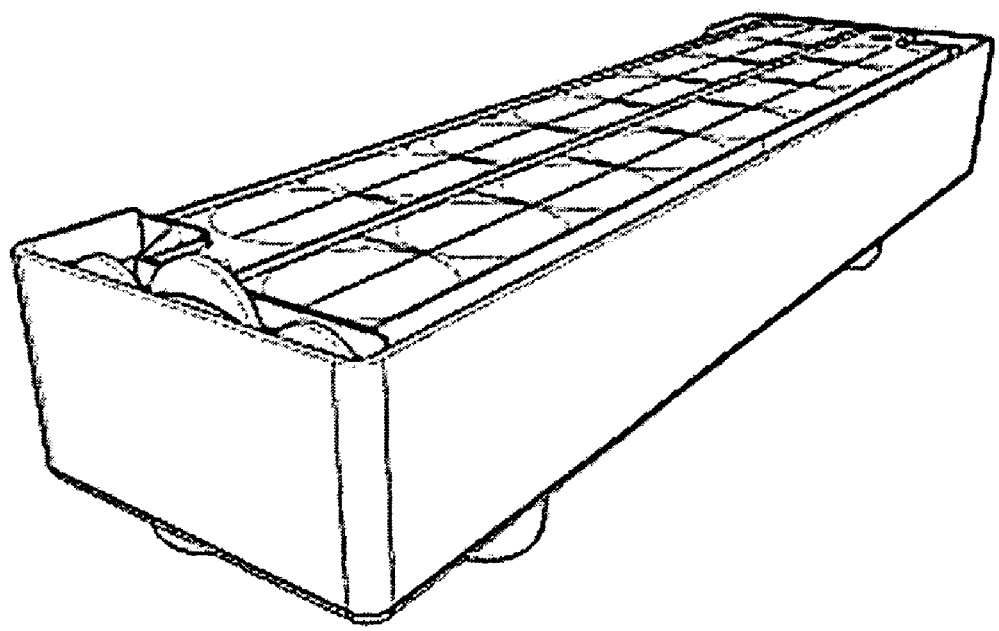

Referring to FIG. 2, a predicted gain pattern from an antenna configured according to embodiments of the present invention is presented. The gain plot is produced by a 3-D electromagnetic field simulation program. The antenna generating the predicted gain pattern had two antenna arms each arranged in Archimedean spirals. The spiral antenna can be etched on printed circuit board material or other dielectric material, wherein the Archimedean spirals are an electromagnetically balanced configuration. The balun is fastened and soldered to the antenna at a right angle at the balanced end. A 50 Ohm feed can be provided, for example, by a coaxial cable to the unbalanced side of a microstrip balun to be transformed to match a 150 Ohm impedance at the launch point, where the feed lines contact the antenna arms.

In one implementation, a plurality of antennas that are each configured according to embodiments of the present invention can be arranged in an array as described in U.S. patent application Ser. No. 11/240,519, which is incorporated herein by reference. One example of an array of antennas includes, but is not limited to, an interlaced linear array, which utilizes a linear array of transmitters configured to transmit electromagnetic radiation and a linear array of receivers configured to receive the reflected signal from said transmitters. In particular, the instant interlaced linear array comprises a linear array of transmitters configured to transmit electromagnetic radiation between the frequency of 200 MHz and 1 THz, and a linear array of receivers configured to receive the reflected signal from said transmitters. The transmit and receive arrays can each have an element spacing of $2\Delta$ and the arrays can be offset from each other by distance $\Delta$. Electromagnetic radiation from each transmitter is reflected from an object being sampled, each receiver then receives the reflected signal. Each transmit and receive antenna pair thus approximates a sample at the spatial point located half-way between the phase centers of each antenna, hereinafter referred to as the "virtual sampling point"

For example, an array can sequentially sample an object by switching on a first transmit antenna, and a first receive antenna, and collecting a first spatial sample at a first virtual location half-way between the actual transmit and receive antennas. A second transmit antenna can then be switched on and the second sample collected (with the first receive antenna r1 still switched on) to collect another sample at a second virtual location. A second receive antenna is then switched on (with the second transmit antenna t2 still on) to collect the third spatial sample at yet another virtual location between the second transmit and receive antennas. This process is then continued across the array. In this manner, the array of transmitters and receivers approximates an array of antennas each placed at the virtual sampling points, and with each functioning simultaneously as a transmitter and receiver. This particular arrangement of transmitters and receivers results in a 1:1 ratio of elements to sampling points, and does not, therefore, result in a reduction of the total number of elements. Additional configurations are contemplated wherein the number of antenna elements can be reduced by using receivers in combination with three or more transmitters, receivers in combination with three or more transmitters, or both. In this manner, the total number of virtual sampling points can be held constant while the number of elements is reduced.

When compared with traditional antenna arrangements, the interlaced linear array minimizes the total number of receivers and transmitters required to make an image of a given resolution because at least one of the receivers is configured to receive the reflected signal from three or more transmitters, and at least one transmitter is configured to transmit a signal to an object, the reflection of which will be received by at least three receivers. Additional details and embodiments are contemplated and described in U.S. patent application Ser. No. 11/240,519, entitled "Interlaced Linear Array Sampling Technique for Electromagnetic Wave Imaging", which is incorporated herein by reference.

Figure 4:
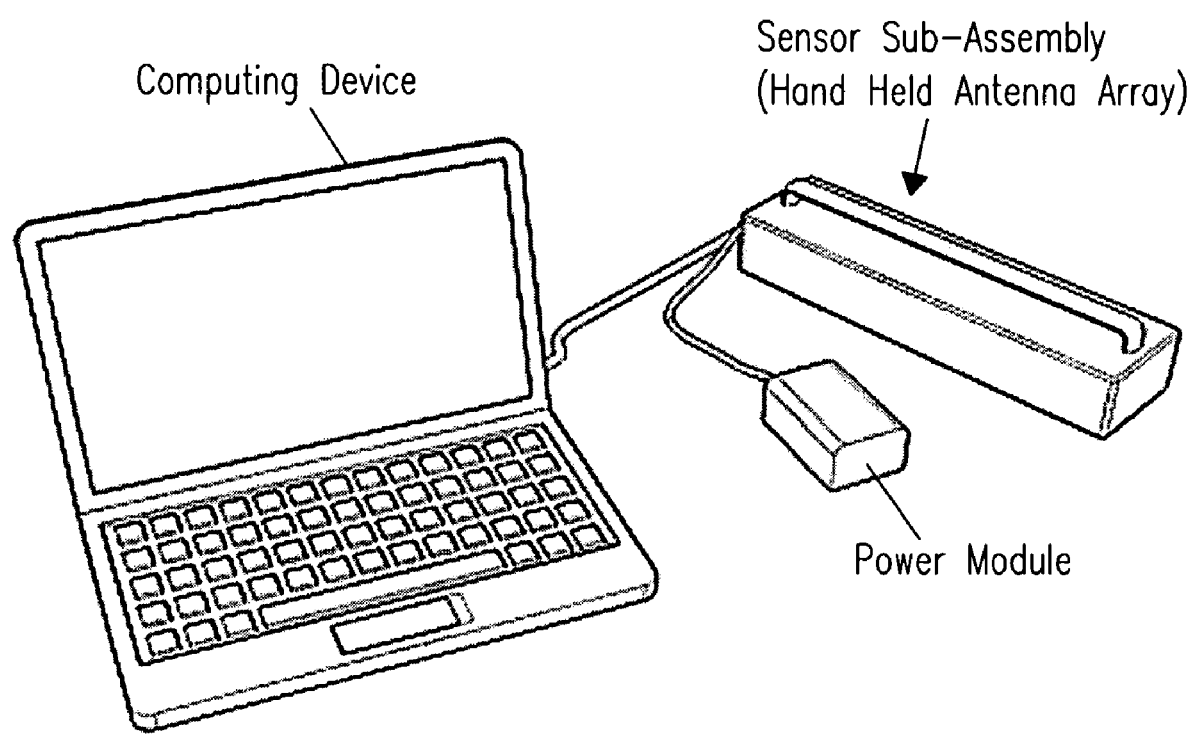
FIG. 4 is an illustration depicting an embodiment of the present invention.

An exemplary implementation of the present invention includes a handheld device. Referring to the embodiment depicted in FIG. 3, the "Snoopy System," comprises an antenna array, an RF switch matrix, radar transceiver, antenna and transceiver control electronics, and data acquisition and image construction processors. The device can be pressed up against a barrier and manually scanned over a region of interest. In one embodiment, as depicted in FIG. 4, the handheld scanner can be tethered to a power supply and a host computing device, which controls aspects of the scanner and constructs images from received data.

Figure 5:
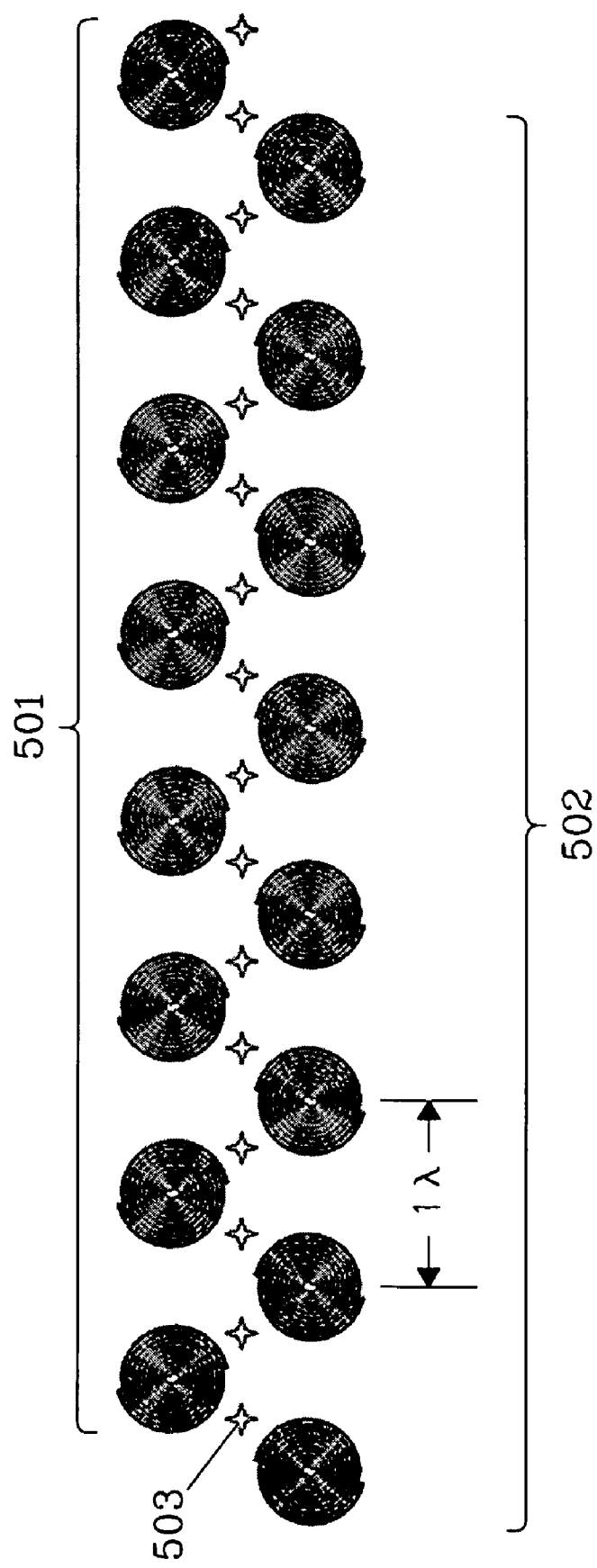
FIG. 5 is an illustration of an antenna array according to embodiments of the present invention.

Referring to the embodiment depicted in FIG. 5, the antenna implemented in the Snoopy System comprises two, eight element linear arrays 501 and 502. One of the eight element antenna arrays 501 transmits a wide-band, swept RF emission and the other array 502 receives the signals reflected from objects in the field of the aperture of the array. The transmit and receiver arrays are separated by radar absorbing material to reduce the amount of signal that passes directly between the antennas. Of the two antenna arrays, one is right hand circularly polarized and the other is left hand circularly polarized. The cross-polarization technique maintains the highest possible signal level produced by a single reflection from the objects of interest. The antennas in each linear array are positioned one wavelength apart, center-to-center. The two linear arrays are offset relative to each other by one half wavelength. Offsetting the arrays allows the signals to be sampled spatially at virtual sampling points 503, which for this particular arrangement occur at two times the number of transmit-receiver pairs minus one (i.e., eight pairs generate 15 virtual sample points). Other arrangements can generate more or fewer virtual sample points as is described elsewhere herein.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A circularly-polarized antenna connected to an active holographic imaging device and to at least one of a transceiver that transmits and receives, or to at least one transmitter that transmits and to at least one receiver that receives, electromagnetic radiation at one or more frequencies between 50 MHz and 1 THz through a barrier having a dielectric constant, the antenna characterized by:
   a dielectric loading comprising a dielectric material on which is fabricated antenna arms arranged as concentric Archimedean spirals originating at an antenna launch point, wherein the dielectric material has a dielectric constant substantially matching the dielectric constant of the barrier; and
   a balun that matches an unbalanced feed impedance to an impedance of the antenna launch point;
wherein the antenna removes barrier front-surface reflections and couples electromagnetic energy into the barrier.

2. The antenna of claim 1, wherein the transmitter transmits, the receiver receives, and the transceiver transmits and receives electromagnetic radiation at one or more frequencies that are between approximately 0.5 GHz and 110 GHz.

3. The antenna of claim 1, wherein the barrier material comprises concrete, masonry, wallboard, wood, ceramic, or combinations thereof.

4. A method for active holographic imaging through a barrier, the method characterized by the step of:
   transmitting and receiving electromagnetic radiation at one or more frequencies between 50 MHz and 1 THz through at least one circularly-polarized antenna each comprising:
      a dielectric loading comprising a dielectric material on which is fabricated antenna arms arranged as concentric Archimedean spirals originating at an antenna launch point, the dielectric material having a dielectric constant substantially matching that of the barrier; and
      a balun that matches an unbalanced feed impedance to the antenna launch point impedance;
   thereby removing barrier front-surface reflections and coupling electromagnetic energy into the barrier.

5. The method of claim 4, wherein the frequencies are between approximately 0.5 GHz and 110 GHz.

6. The method of claim 4, wherein the barrier comprises concrete, masonry, wallboard, wood, ceramic, or combinations thereof.

7. An antenna array comprising a plurality of circularly-polarized antennas, the array connected to an active holographic imaging device and to at least one of a transceiver that transmits and receives, or to at least one transmitter that transmits and to at least one receiver that receives, electromagnetic radiation at one or more frequencies between 50 MHz and 1 THz through a barrier having a dielectric constant, each antenna in the array characterized by:
   a dielectric loading comprising a dielectric material on which is fabricated antenna arms arranged as concentric Archimedean spirals originating at an antenna launch point, wherein the dielectric material has a dielectric constant matching the dielectric constant of the barrier; and
   a balun that matches an unbalanced feed impedance to an impedance of the antenna launch point;
wherein the antenna array removes barrier front-surface reflections and couples electromagnetic energy into the barrier.

8. The antenna array of claim 7, wherein the active holographic imaging device is a handheld device.

* * * * *